Aug. 20, 1957 E. G. CLARK ET AL 2,803,701

AMPLITUDE SELECTION CIRCUIT WITH NOISE CUT-OFF

Filed April 26, 1952

INVENTORS
FRED BERNSTEIN
EDWARD GARY CLARK
BY
Allan V. Hazeltine
ATTORNEY

United States Patent Office 2,803,701

Patented Aug. 20, 1957

2,803,701

AMPLITUDE SELECTION CIRCUIT WITH NOISE CUT-OFF

Edward G. Clark, Elkins Park, and Fred Bernstein, Philadelphia, Pa., assignors to Philco Corporation, Philadelphia, Pa., a corporation of Pennsylvania Application April 26, 1952, Serial No. 284,664

4 Claims. (Cl. 178—7.3)

Figure 1:
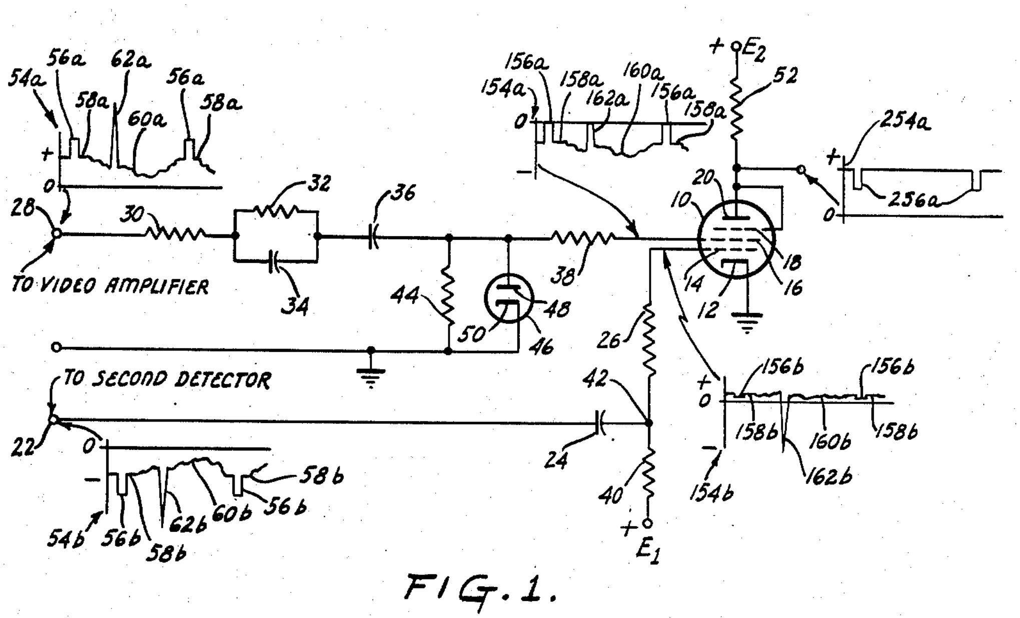

The invention relates to electrical systems and more particularly, to improved amplitude selection circuits for signals comprising recurrent pulses. Such circuits are particularly adapted for use in television receivers in which they serve as separators for the synchronizing pulses of the composite video signal, and it is with respect to this use that the invention will be specifically described.

In its most general form, such a sync separator for television signals comprises a transmission path having a signal cut-off level established by the amplitude of an input signal applied thereto, and is adapted to pass to an output circuit those variations of the input signal which are at amplitude levels greater than the cut-off or threshold level of the path. More particularly, when the input signal is the composite video signal, appropriately poled, the sync separator serves to transmit to its output circuit only those more positive amplitude variations of the composite video signal corresponding to the synchronizing pulses, thereby precluding from the output circuit those variations of a more negative amplitude value which correspond to the image information of the composite video signal.

Desirably, and in order to avoid misoperation of the subsequently energized synchronizing circuits, the output signal of the sync separator should contain only the synchronizing pulses. Under ideal conditions, in which the image information is sufficiently removed amplitude-wise from the synchronizing information to allow for unambiguous amplitude selection of the synchronizing pulses, this mode of operation is achieved by the known sync separating circuits. In practice, however, the composite video signal is contaminated with noise impulses, which extend in the same direction as the sync pulses and have an amplitude greater than that of the sync pulses. Under the latter conditions, the threshold-operated separators of the prior art are incapable of discriminating between the sync pulses and the noise pulses, and both of these pulses will be found in the output signal of the separator.

An additional undesirable effect produced by such noise pulses is a variation in the cut-off or threshold level of the separator. This variation may be so pronounced as to cause the threshold level to rise or "back-off" to a value greater than the maximum amplitude of the sync pulses. The separator then prevents the passage of even the sync pulses, and the only output signal derived therefrom, for an interval following the noise pulse determined by the time constant of the separator, corresponds to the large amplitude noise pulses.

While several proposals have been made for reducing the "back-off" effect to a substantial degree, no simple method has heretofore been available for excluding the noise pulses from the output of the separator system. Most of the prior-art attempts to fulfill this aim, have required the use of systems comprising at least two tubes, each with three or more elements, or have employed expensive, and at times unstable, pentagrid tubes. These latter systems require relatively large noise suppression signals and, because of the remote cut-off grid characteristicts of the pentagrid tubes, have not been able to suppress completely the noise pulses occurring between synchronizing pulses.

It is accordingly an object of the invention to provide improved amplitude selection circuits.

Another object of the invention is to provide improved amplitude selection circuits for signals comprising recurrent pulses.

A further object of the invention is to provide improved amplitude selection circuits adapted to extract the synchronizing pulses from the composite video signal of a television system.

An additional object of the invention is to provide amplitude selection circuits adapted to serve as sync separators in television systems, and further adapted to produce output signals which are relatively unaffected by noise pulses present in the input signals to the said circuits.

A specific object of the invention is to provide improved sync separating circuits, the outputs of which contain the desired synchronizing pulses substantially free of contaminating noise pulses.

A still further object of the invention is to provide sync separating circuits characterized by reliability, simplicity and low cost.

Yet another object of the invention is to provide amplitude selection circuits utilizing inexpensive, readily available tubes operating under conditions of excellent stability.

In accordance with the invention, the above objects are achieved by a noise-limiting amplitude selection system which comprises an electron discharge tube having at least two control grid electrodes arranged in consecutive order between the cathode and the output electrode of the tube. As a feature of the invention, the composite video signal containing synchronizing pulses and image information is applied with the synchronizing pulses in a negative-going sense to the grid electrode nearest to the cathode, and is also applied in a positive-going sense to the other grid electrode. Furthermore, the first control grid electrode, to which the composite video signal is applied with the synchronizing pulses in a negative-going sense, is made to operate as a space-charge grid by applying an appropriate steady-state potential thereto, and the second control grid, to which the composite video signal is applied with the synchronizing pulses in a positive-going sense, is made to operate under conditions such that the potential thereof does not exceed that of the cathode of the electron discharge tube.

Under the above conditions, and by the maintenance within prescribed limits of the amplitude values of the composite video signals applied to the first and second grids, the sync separating tube is made to exhibit a sharp cut-off characteristic whereby negative-going noise pulses having amplitude values greater than that of the synchronizing pulses applied to the first control grid electrode of the tube produce substantially instantaneous cut-off of the anode current of the tube and prevent the noise pulses present in the composite video signal applied to the second control grid from appearing in the output signal of the system.

Figure 2:
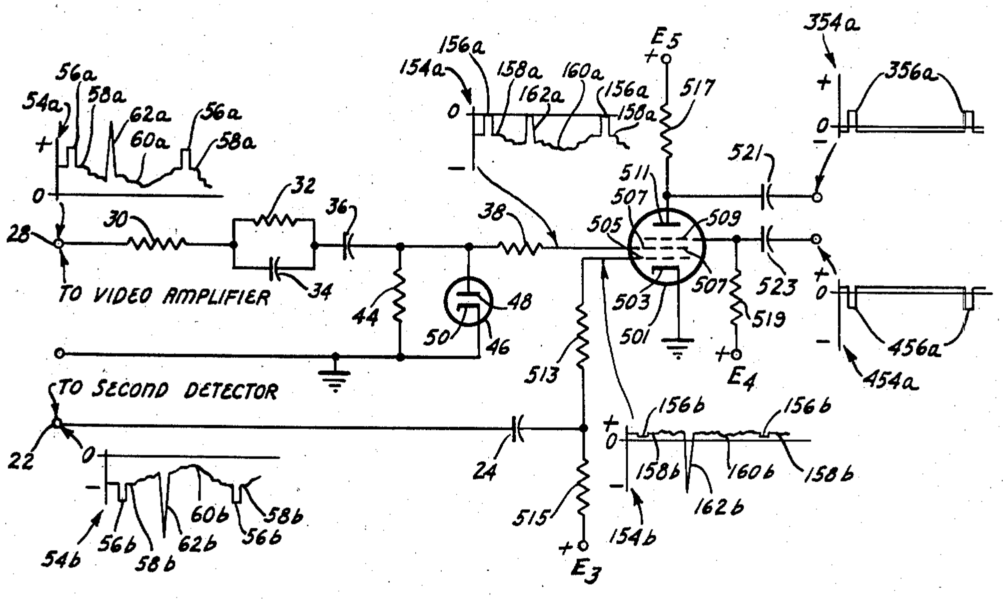

The invention will be described in greater detail with reference to the appended drawings forming part of the specification, and in which Figure 1 is a schematic diagram of a first embodiment of the invention; and Figure 2 is a schematic diagram of a second embodiment of the invention.

The embodiment of the invention shown in Figure 1 comprises an electron discharge tube 10 having a cathode 12, a first grid 14, a second grid 16, a third grid 18 and an anode 20. In accordance with the invention, the composite video signal, with recurrent synchronizing pulses extending in a negative sense, is supplied to the control grid adjacent to the cathode, i. e., to grid 14, while the same composite video signal, having the synchronizing pulses thereof extending in a positive sense, is supplied to a second control grid, i. e., to grid 16. These two composite signals may be derived from appropriate portions of the television receiver in a manner well known to those skilled in the art. More particularly, the first of the composite signals may be derived from the video detector of the television receiver, the detector being poled so as to produce a composite video signal with negative-going synchronizing pulses, whereas the second composite signal may be derived from the anode circuit of the video amplifier immediately following such a video detector. The negative-going composite video signal is supplied to grid 14 at a terminal 22 through a capacitor 24 and a resistor 26, while the composite video signal, having positive-going synchronizing pulses, is supplied at an input terminal 28 to the grid 16 through a resistor 30, a resistance-capacitance network 32, 34, a capacitor 36 and a resistor 38.

In order that the first control grid 14 shall operate under space charge conditions, in accordance with the invention, the grid 14 is supplied by a source of positive potential indicated at $E_1$ through a current-limiting resistor 40 connected to the junction 42 of the capacitor 24 and the resistor 26. In further conformity with the space-charge mode of operation and with the sync separating function of the circuit, means comprising the capacitor 36, a resistor 44, a diode 46 shunting the resistor 44, and a resistor 38 are provided for establishing a negative signal bias on grid 16. The anode 48 of diode 46 is connected to the high potential side of resistor 44, and the cathode 50 is connected to a point at ground potential. The diode 46 serves a further purpose in that its operation, in combination with the resistor 38, substantially prevents the grid 16 from assuming a positive potential when positive-going signals are applied at the terminal 28.

The grid 18 is connected to the anode 20, which electrodes, in combination, serve as the output electrode system of the tube 10, and are energized, from a source of positive potential shown at $E_2$, through a load resistor 52.

As a consequence of the space-charge conditions produced at the grid 14, the operation of tube 10 is characterized by a high transconductance between control grid 16 and anode 20, and by a sharp anode current cut-off when space-charge grid 14 is driven only slightly negative with respect to the cathode 12.

The composite video signal applied to grid 16 contains both the horizontal and vertical synchronizing pulses and has a waveform well known to those skilled in the art. A portion of the waveform of this signal corresponding to one line scansion of the image is depicted as 54*a*. As will be noted, this signal comprises spaced synchronizing pulses 56*a* extending in a positive direction and recurring at the line scanning rate of the image to be reproduced, e. g., at a frequency of 15,750 cycles per second. The synchronizing pulses 56*a* extend beyond the blanking pedestals 58*a* and, interposed between successive blanking pedestals, are the more negative-going variations of the signal shown as 60*a*, corresponding to the image information to be reproduced.

The signal 54*a* will rarely be free of spurious noise pulses; rather, it will frequently contain many spurious pulses such as the one indicated as 62*a*. The noise pulse 62*a*, which is representative of noise pulses typically found intermingled with the composite video signal, extends in the same sense as the synchronizing pulses and has an amplitude in many instances greater than that of the synchronizing pulses. The amplitude of such a noise pulse can be reduced to some extent, by means of the resistance-capacitance network at the input to grid 16, constituted by resistors 30, 32, 38 and 44, capacitors 34 and 36 and by the diode 46. However, the degree of attenuation of the noise pulses achieved by these networks is limited to the maximum amplitude of the synchronizing pulses, so that the signal applied to grid 16 has, at best, the form shown by the waveform 154*a*, from which it will be noted that the amplitude of the noise pulse 162*a* is reduced only to the maximum amplitude of the synchronizing pulses 156*a*. In prior-art systems, this noise pulse would normally appear in the output circuit of the sync separator tube with an amplitude equal to that of the synchronizing pulses, and the presence of this spurious pulse would deleteriously affect the operation of the subsequently energized synchronizing circuits.

In accordance with the invention, the noise pulse 162*a* is prevented from appearing in the output signal of the system by constructing the sync separator so that the anode current of tube 10 is cut off during the intervals in which noise pulses having amplitudes greater than those of synchronizing pulses are present in the composite video signal. This noise-pulse obliterating action is obtained by applying the composite video signal to the first control grid 14 in a sense opposite to that of the composite viedo signal applied to grid 16, and by operating grid 14 under space-charge conditions so that, as has already been pointed out, the tube 10 is made to exhibit a sharp cut-off characteristic between grid 14 and the output electrode system, for small negative-going changes in the potential of grid 14. The signal applied to grid 14 at terminal 22 has a waveform shown at 54*b* which, except for sense and amplitude, corresponds point-by-point with waveform 54*a*. Accordingly, the corresponding components of the waveforms 54*a* and 54*b* have been indicated by identical numerals, suffixed by the letters *a* and *b* respectively; hence, poise pulse 62*b* in waveform 54*b* corresponds to noise pulse 62*a* in waveform 54*a*.

As aforementioned, grid 14 is maintained at a slightly positive potential by being connected through resistors 26 and 40 to the source of positive potential $E_1$. By the employment of a resistor 26 having a sufficiently large value, the resistance between cathode 12 and grid 14 is made to exhibit a characteristic such that, for negative-going changes of the input signal within the amplitude value of the sync pulses, and for positive-going variations of the input signal, the said cathode-grid resistance assumes a low value. On the other hand, for negative-going variations of the input signal having amplitude values greater than the amplitude value of the sync pulses, the cathode-grid resistance assumes a large value, and, as a consequence, substantially the full amplitude values of the latter negative-going variations are applied between cathode 12 and grid 14.

More particularly, negative excursions of the signal shown at 54*b* which are insufficiently large to drive grid 14 negative, e. g., the negative excursions of the signal within the amplitude range of the synchronizing pulses 56*b*, have substantially no effect on the anode current of tube 10, whereas negative excursions of the waveform to amplitude values greater than that of the synchronizing pulses 56*b*, e. g., the excursion corresponding to noise pulse 62*b*, cause space-charge grid 14 to become negative with respect to the cathode 12 thereby cutting off the anode current of the tube. The waveform corresponding to 54*a* which is produced by the above-described operation of the system is shown at 154*b*. Since the negative pulse 162*b* of waveform 154*b* occurs at the same instant as the noise pulse 62*a* of waveform 54*a*, the tube 10 is cut off at the instant of occurrence of noise pulse 62*a*, and, as a consequence of this action, the output signal shown as waveform 254*a* consists substantially only of pulses 256*a*, the desired synchronizing pulse output signal.

In the specific arrangement shown in Fig. 1, the components indicated therein may have the following values, and the signals and applied voltages, the following amplitudes:

Discharge tube 10 may be a type 6AU6 pentode while diode 46 may be one section of a type 6AL5 double diode. Resistor 26 may have a value of 10,000 ohms, which value has been found sufficient to level the synchronizing pulse components of the video signal applied to terminal 22 to produce the waveform 154*b*. Voltages $E_1$ and $E_2$ may each be set at +250 volts, in which case resistor 40, which serves to limit the current to grid 14, may have a value of 0.68 megohm. The coupling capacitor 24 may be given a value of 0.01 microfarad. Anode load resistor 52 may have a value of 39,000 ohms, resistor 38, a value of 15,000 ohms, resistor 44, a value of 1 megohm, whereas capacitor 36 may be 0.047 microfarad. Resistor 30 may be 27,000 ohms, resistor 32, 0.47 megohm and capacitor 34, 100 micromicrofarads. The input signal at terminal 28 may have a peak-to-peak amplitude of 20 to 30 volts, while the input signal at terminal 22 may have a peak-to-peak amplitude of 4 to 5 volts.

A second embodiment of the invention is shown in Figure 2. This second embodiment has many features in common with the embodiment shown in Fig. 1, and identical reference numbers have been applied to corresponding components in each of the two figures. As in the case of Fig. 1, the embodiment of the invention shown in Figure 2 comprises an electron discharge tube 501 having a cathode 503, a first grid 505, a second grid 507, a third grid 509 and an anode 511. The grid 505 is operated at a positive potential to provide a space-charge region between grid 505 and grid 507. To establish this positive potential, grid 505 is coupled through series-connected resistors 513 and 515 to a source of positive potential indicated at $E_3$, while cathode 503 is connected to a point at ground potential. In further conformity with the space-charge mode of operation and with the sync separating function of the circuit, means comprising the capacitor 36, the resistor 44, the diode 46 shunting the resistor 44, the resistor 38 are provided for establishing a negative signal bias on grid 507. The anode of diode 46 is connected to the high potential side of resistor 44, and the cathode 50 is connected to a point at ground potential. The diode 46 serves a further purpose in that its operation, in combination with the resistor 38, substantially prevents the grid 507 from assuming a positive potential when positive-going signals are applied at the terminal 28.

In further similarity to the embodiment shown in Fig. 1, a positive-goiing composite video signal, having a waveform 54*a* and derived from the video amplifier, is supplied to grid 507 at terminal 28 through a network comprising the series-connected combination of resistor 30, resistor 32 connected in parallel with capacitor 34, capacitor 36 and resistor 38. Also as in the previous embodiment, the signal with positive-going synchronizing pulses which is inserted at terminal 28 develops a bias voltage across capacitor 36, which bias voltage maintains grid 507 at a sufficiently negative potential with respect to cathode 503 to cut off the anode current of tube 501 in the intervals between positive-going pulses for signal amplitude values below that of the synchronizing pulses.

The embodiment of the invention shown in Fig. 2 provides two output signals of opposite polarity. The availability of two such output signals considerably simplifies the design of a television receiver in that it makes available two signals for individually supplying the horizontal and vertical scanning signal generators of the television receiver, and for supplying the balanced-input phase comparator circuit used in the automatic frequency control system usually associated with the aforementioned horizontal scanning signal generator.

To produce these output signals, indicated by the waveforms 354*a* and 454*a*, the tube 501 is made to exhibit a negative transconductance characteristic between grid 507 and anode 511, and a positive transconductance characteristic between grid 507 and output electrode 509. This action is achieved by operating the grid electrode 509 at a voltage higher than that of the adjacently positived anode 511. As a consequence of this mode of operation, the output signal 354*a* derived from the anode 511 by a load resistor 517 has a sense corresponding to that of the input signal applied to the control grid 507, while the output signal 454*a* derived from the grid electrode 509 by a load resistor 519 has a sense opposite to that of the input signal applied to grid 507.

The two output signals 354*a* and 454*a* may be balanced by appropriate selection of the values of load resistors 517 and 519, and, in general, the values of these load resistors are related inversely to the magnitude of the transconductance between the control grid 507 and anode 511, and between the control grid 507 and the output grid 509, respectively.

In a typical instance, the parameters of the embodiment shown in Figure 2 may have the following values:

The values of the components bearing identical numbers in Figs. 1 and 2 may be the same as those given in the discussion of the first embodiment and are consequently not repeated here. Tube 501 may, as in the previous case, be a type 6AU6 pentode. The resistive elements 513 and 515 may have values of 10,000 ohms and 1 megohm, respectively, while anode load resistor 517 may have a resistance of 47,000 ohms, and the load resistance 519 coupled to grid 509 may be 18,000 ohms. The coupling capacitors 521 and 523 may each be 0.01 microfarad. The positive voltages applied to terminals $E_3$ and $E_4$ may each have a value of +250 volts, while a voltage of +60 volts may be introduced at terminal $E_5$.

While specific values have been given for the components, and specific tubes of the type 6AU6 and the type 6AL5 have been referred to because of their low cost, reliability and wide availability, it is clear to those skilled in the art that the embodiment of the above invention is not limited to circuits containing the specifically named components. More particularly, while, in Fig. 1, tube 10 is represented by a pentode having its third grid 18 connected to its anode 20, a tetrode type tube is equally applicable. Furthermore, in the embodiment shown in Fig. 2, the discharge tube 501 need not be a type 6AU6 tube, but may be, for example, a pentode having an anode treated so as to have a large secondary emission ratio, thereby to enhance the negative transconductance between the control grid 507 and the anode 511.

While we have described our invention by means of specific examples and in specific embodiments, we do not wish to be limited thereto, for obvious modifications will occur to those skilled in the art without departing from the spirit and scope of the invention.

We claim:

1. A sync separator system for selecting recurrent time-spaced synchronizing pulses having an amplitude value greater than a given value from a composite video wave comprising the said synchronizing pulses and noise pulses occurring during intervals between the said synchronizing pulses and having an amplitude value greater than the said amplitude value of the said synchronizing pulses, said system comprising an electron discharge tube having a cathode, an output electrode system, a first control electrode arranged between the said cathode and the said output electrode system and a second control electrode arranged between the said first control electrode and the said output electrode system, first and second resistance elements interconnected in series relationship, means to connect the free end of the said first resistance element to the said first control electrode, means to apply to the free end of the said second resistance element a potential positive with respect to the said cathode, a first capacitor having one terminal coupled to the junction of the said first and second resistance elements, means to apply to the other terminal of the said first capacitor the said composite video wave with the said synchronizing pulses extending in a negative sense, third and fourth resistance elements connected in series relationship between the said second control electrode and the said cathode, a unidirectional conducting element shunting the said fourth resistance element, a resistance-capacitance network having one end thereof connected to the junction of the said third and fourth resistance elements, said network comprising in series connection a second capacitor, fifth and sixth resistance elements and a third capacitor shunting the said fifth resistance element, and means to apply to the other end of the said resistance-capacitance network the said composite video wave with the said synchronizing pulses thereof extending in a positive sense, and means to derive an output signal from the said output electrode system.

2. A sync separator system according to claim 1 in which the said output electrode system of the said electron discharge tube comprises an anode and a resistance element coupled to the said anode.

3. A sync separator system according to claim 1 in which the said output electrode system of the said electron discharge tube comprises an anode, a second output electrode arranged between the said second control electrode and the said anode, and seventh and eighth resistance elements coupled to the said anode and the said second output electrode respectively, and means to apply to the said anode and the said second output electrode potentials positive with respect to the cathode and having first and second given values, the value of the positive potential applied to the said second output electrode having a value greater than that of the positive potential applied to the said anode, whereby the said discharge tube is caused to exhibit a positive transconductance between the said second control electrode and the said second output electrode and a negative transconductance between the said second control electrode and the said anode.

4. A sync separator system for selecting recurrent time-spaced synchronizing pulses having an amplitude value greater than a given value from a composite video wave comprising said synchronizing pulses and noise pulses occurring during intervals between said synchronizing pulses and having an amplitude value greater than said amplitude value of said synchronizing pulses, said system comprising an electron discharge tube having a cathode, an output electrode system, a first control electrode arranged between said cathode and said output electrode system and a second control electrode arranged between said first control electrode and said output electrode system, a first capacitor and a first resistance element connected in series relationship, means connecting the free terminal of said first resistance element to said first control electrode, means for applying to the free terminal of said first capacitor said composite video wave with said synchronizing pulses extending in a negative sense, a second resistance element, means connecting one terminal of said second resistance element to a terminal of said first resistance element, means for applying a potential positive with respect to said cathode to the other terminal of said second resistance element, third and fourth resistance elements connected in series relationship between said second control electrode and said cathode, a unidirectional conducting element shunting said fourth resistance element, a resistance-capacitance network having one terminal thereof connected to the junction of said third and fourth resistance elements, said network comprising in series connection a second capacitor, fifth and sixth resistance elements, and a third capacitor shunting said fifth resistance element, and means for applying to the other end of said resistance-capacitance network said composite video wave with said synchronizing pulses thereof extending in a positive sense; and means for deriving an output signal from said output electrode system.

References Cited in the file of this patent

UNITED STATES PATENTS

| | | |
|---|---|---|
| 1,975,143 | Farnsworth | Oct. 2, 1934 |
| 2,228,084 | Murcek | Jan. 7, 1941 |
| 2,240,605 | Bingley | May 6, 1941 |
| 2,265,269 | Dallos | Dec. 9, 1941 |

FOREIGN PATENTS

| | | |
|---|---|---|
| 379,988 | Italy | Apr. 15, 1940 |
| 115,307 | Australia | June 25, 1942 |
| 620,585 | Great Britain | Mar. 28, 1949 |

OTHER REFERENCES

Rider's Television Manual, vol. 8, Kaye-Halbert TV, pages 8–5 (Kaye-Halbert date Mar. 29, 1951. Emerson TV, pages 8–46, 54 (Emerson TV date March 25, 1951).

Rider's Television Manual, vol. 9, Zenith TV, pgs. 9–1 and 9–8, Zenith date Sept. 11, 1951 (see Zenith page 9–1).

Electronics, April 1952, pages 124–127.